United States Patent [19]

Cao et al.

[11] 4,300,653
[45] Nov. 17, 1981

[54] SEISMIC SOURCE ARRAY FIRING CONTROLLER

[75] Inventors: Chung Van Cao; Phillip W. Ward, both of Dallas, Tex.

[73] Assignee: Texas Instruments Incorporated, Dallas, Tex.

[21] Appl. No.: 32,596

[22] Filed: Apr. 23, 1979

Related U.S. Application Data

[63] Continuation of Ser. No. 736,967, Oct. 29, 1976, abandoned.

[51] Int. Cl.³ .............................................. G01V 1/38
[52] U.S. Cl. .................................... 181/107; 181/111; 181/120; 367/144; 235/92 T
[58] Field of Search ............... 181/107, 110, 111, 118, 181/120; 235/92 T, 92 PE; 367/144

[56] References Cited

U.S. PATENT DOCUMENTS

| | | | |
|---|---|---|---|
| 3,439,319 | 4/1969 | Whitfill, Jr. | 340/7 R |
| 3,687,218 | 9/1972 | Ritter | 181/107 |
| 3,985,199 | 10/1976 | Baird | 181/107 |
| 4,034,827 | 7/1977 | Leerskov, Jr. et al. | 181/107 |
| 4,047,591 | 9/1977 | Ward et al. | 181/107 |

*Primary Examiner*—Howard A. Birmiel
*Attorney, Agent, or Firm*—Thomas G. Devine; Melvin Sharp; N. Rhys Merrett

[57] ABSTRACT

There is disclosed apparatus for controlling the precise time of firing of each air gun in an array of air guns employed in marine seismic exploration. For each air gun in the array, the apparatus maintains a record of past measured gun delays, that is the time period expiring between the triggering of an air gun and the time that the gun actually fires. Upon the receipt of a fire command, the apparatus inserts appropriate delays before triggering the individual air guns. In this way the air guns are controlled to fire in a precise predetermined sequence. The air guns may be caused to fire either simultaneously or sequentially so as to exercise effective control over the spectral content and the directionality of the energy generated by the array.

8 Claims, 11 Drawing Figures

SEISMIC SOURCE ARRAY FIRING CONTROLLER

This is a continuation of Ser. No. 736,967 filed Oct. 29, 1976, now abandoned.

This invention relates to a controller for an array of seismic sources, and more particularly to a controller for governing the precise time of firing of each member in an array of marine pneumatic seismic sources.

In seismic surveying under water, acoustical energy is generated by the seismic sources employed submerged in the water and is utilized to investigate subsurface geological conditions and formations. For this purpose, one or more of such seismic sources, which are often called air guns, are submerged in the water; compressed air, or other gas or gasses under pressure, is fed to the submerged source and temporarily stored therein. At the desired instant, the seismic source or sources are actuated, i.e., "fired" and the pressurized gas is abruptly released into the surrounding water. In this manner powerful acoustical waves are generated capable of penetrating deeply into subsurface material to be reflected and refracted therein by the various strata and formations. The reflected or refracted acoustical waves are sensed and recorded to provide information and data about the geological conditions and formations.

It is also possible to submerge such seismic sources in marsh land, swamp or mud areas which are infused with sufficient water that the seismic surveying apparatus described herein can be used. Accordingly, the term "water" as used herein is intended to include marsh land, swamp or mud which contains sufficient water to enable such apparatus to be used.

It has been found advantageous in marine seismic exploration to generate a plurality of acoustic waves from an array of air guns in order to provide a composite acoustic wave of satisfactory amplitude and having a controllable frequency content and/or directionality. Air guns having various volume capacities may be utilized in such arrays so as to produce a composite acoustic wave having a broad frequency band, since air guns of different volumes generate acoustic waves with different frequency spectra. The realization of the desired spectral content and/or directionality, however, requires that the relative times at which the various air guns of an array release their pressurized gasses be controlled in a precise manner. Air guns of the type contemplated for use with the present invention exhibit a characteristic time delay between the time a firing signal is transmitted to the air gun and the time when the air gun actually fires. It is known that this characteristic time delay may vary from air gun to air gun and further that it may vary as a function of time for any particular air gun.

In the past, attempts to synchronize the firing of an array of air guns have involved periodic measurement of the time delays for each of the air guns in the array. One such system is that disclosed in U.S. Pat. No. 3,687,218 to Ritter. Such periodic measurements, for example, might occur at the beginning of each day of shooting. The assumption was made that the time delay for any given air gun remains constant for the remainder of the shooting period. Additional appropriate time delays are inserted between the time a master fire command is issued and the time that a trigger signal is issued for each air gun. As a result, in theory the air guns of the array will fire in a predetermined sequence, typically simultaneously. In practice, however, the precise control that is required is not achieved, partially as a result of the fact that the characteristic time delay for the various air guns may vary during the period of shooting. Array operation may further be degraded if air guns of the array enter undetected fault states such as a self-fire condition or no-fire condition. Self-fire occurs when an air gun fires without receiving a trigger signal or fires more than once for a single trigger signal. A no-fire condition occurs when an air gun which has received a fire signal fails to fire. Such conditions normally are not discovered by prior art methods of control.

It is therefore an object of the invention to provide an improved apparatus for controlling the firing of an array of air guns.

It is another object of the invention to provide an air gun controller which utilizes continually updated measurements of the gun delays for the various air guns in synchronizing their operation.

It is a further object of the invention to provide an air gun controller which detects the existence of fault conditions and takes appropriate measures.

In accordance with one aspect of the invention, there is provided a controller which measures, for each air gun and at each firing thereof, the time delay between the reception of a trigger signal by the air gun and the actual time of firing of the air gun. For each air gun, this measured delay is utilized as the characteristic time delay for the air gun for the next firing sequence. At each firing sequence upon the receipt of a master fire command, the controller transmits a trigger signal to each air gun only after the expiration of a trigger delay time appropriate to that specific air gun. By appropriate selection of the individual trigger delay times, the controller insures that the individual air guns are fired precisely in a predetermined sequence. Since the characteristic time delay for any individual air gun is measured at each shot, these time delays utilized by the controller are expected to be very precise.

In accordance with another aspect of the invention, rather than using the single most recent measured delay as the characteristic for any air gun, the controller may utilize a running average of the measured air gun delays over a preselected number of most recent measured delays. A newly measured delay time is included in the running average for that specific air gun only if it falls within a preselected time range centered about the presently existing running average for that particular air gun. In this way occasional anomalous time delay measurements may be discarded so as not to provide an erroneous measure of the characteristic time delay for the air gun.

In another aspect of the invention, the controller is adapted to recognize the existence of a self-fire fault for a particular air gun. Upon the occurrence of a self-fire fault the offending air gun is disabled from firing in subsequent shots. The air gun controller is further adapted to recognize the existence of a no-fire fault for a particular air gun. Upon the occurrence of a no-fire fault, the offending air gun is placed in a default timing mode as will be disclosed in greater detail subsequently. In the practice of the invention, there is required a precise means for measuring the actual time of firing of the individual air guns of an array. Suitable measurement means are disclosed in copending U.S. Pat. application Ser. Nos. 564,931 and 564,932, both filed Apr. 3, 1975, now U.S. Pat. Nos. 4,034,827 and 4,047,591, respectively and assigned to the assignee of the present invention.

Other objects and features of the invention will become more readily understood from the following detailed description and appended claims when read in conjunction with the accompanying drawings wherein:

Figure 1:
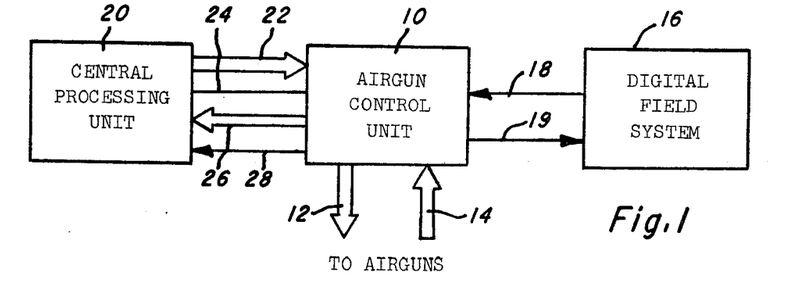
FIG. 1 is a block diagram of the air gun control system.

FIG. 1 is a block diagram illustrating the relationship of the invention to other elements of a marine seismic data collection system. Air gun control unit 10 communicates with the air guns of an array by means of multichannel busses 12 and 14. Each channel of bus 12 is utilized to communicate a firing signal from air gun control unit 10 to one of the air guns. Similarly, each channel of bus 14 communicates to air gun control unit 10 a signal representative of the actual time of firing of one of the air guns. In a typical application, a digital field system 16 may be coupled to air gun control unit 10 by means of a line 18. A suitable digital field system may be either the DFS IV* or DFS V* available from Texas Instruments Incorporated. Digital field system 16 sends a firing request to air gun control unit 10 on line 18, the air gun control unit executes the fire request and returns a precise time break on line 19 and the digital field system records this time break as timing word zero on magnetic tape with the seismic data. Such firing request may be transmitted in the system of FIG. 1 by line 18. While air gun control unit 10, in the preferred embodiment of the invention, may be utilized as a stand alone unit, it may also be coupled to interact with a central processing unit (CPU) 20. CPU 20 may be a general purpose detail computer dedicated solely to interaction with air gun control unit 10 or it may be time shared among a number of elements of a marine seismic data acquisition system including air gun control unit 10. A suitable CPU is the Model 980A computer available from Texas Instruments Incorporated. In the preferred embodiment, data flows from the CPU 20 to air gun control unit 10 by means of a 16 bit data bus 22 while control signals are communicated by a plurality of control lines represented in FIG. 1 by line 24. Conversely, data is communicated from air gun control unit 10 to CPU 20 by a 16 bit data bus 26 and certain status information is communicated by means of line 28. The communication of data and control bits between a CPU such as the Model 980A computer and peripheral units such as air gun control unit 10 are well known in the art and will not further be discussed herein. Such communication is disclosed, for example, in "Model 980A Computer Input/Output Manual, Manual No. 96069-9701" issued Aug. 15, 1972 revised Mar. 15, 1973; available from Texas Instruments Incorporated.

*Trademark of Texas Instruments Incorporated

Figure 2:
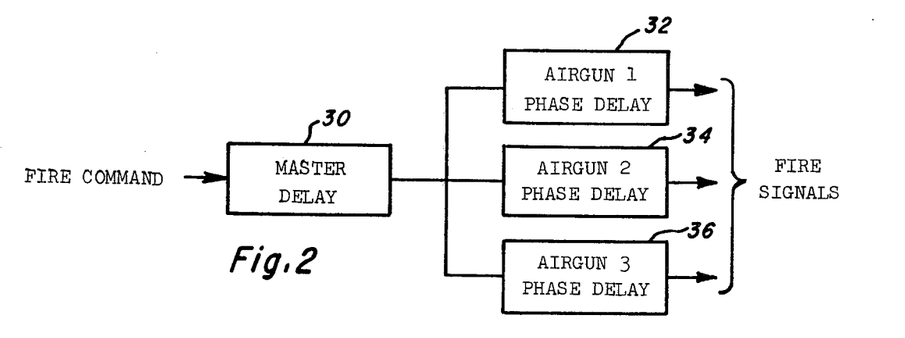
FIG. 2 illustrates the summation of a master delay and phase delays to provide an overall trigger delay.
Figure 3:
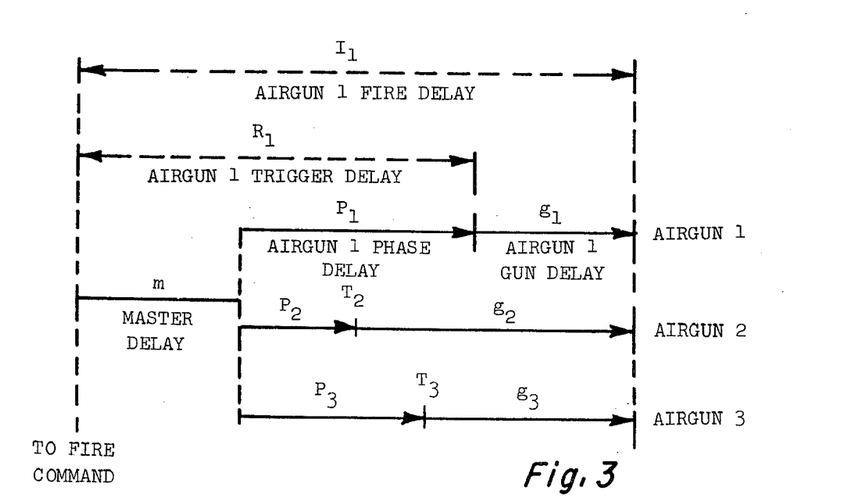
FIG. 3 provides definition of various delays associated with the air gun controller.

The basic timing structure of the air gun control unit is illustrated in FIG. 2. In the interest of clarity, FIGS. 2 and 3 illustrate the air gun controller controlling just three air guns, but in a practical situation many more air guns might be utilized, 40 being a typical number. With reference to FIG. 2, a fire command is an input to master delay unit 30. After a preselected time delay imposed by master delay unit 30, the firing command is passed on to each of air gun phase delay units 32, 34 and 36. Each of phase delay units 32, 34 and 36 then imposes an additional time delay appropriate to the particular air gun with which it is associated. Finally, after these phase delays, the firing commands are passed on to the individual air guns.

The actual timing of the air guns may be better understood with the aid of the timing diagram of FIG. 3. FIG. 3 is illustrative of the situation wherein it is desired to fire the various air guns making up an array simultaneously. Alternatively, the air guns may be caused to fire in a predetermined sequence.

In FIG. 3, the air gun gun delays are represented by the $g_i$ where the i takes the number of the corresponding air gun. The air gun gun delay is that time interval which expires between the time the air gun receives its trigger signal and the time the air gun actually fires. The fire command which is issued at time $t_o$ is delayed for a time m by master delay 30. The fire command is then further delayed by phase delay circuits 32, 34 and 36 for times $P_1$, $P_2$ and $P_3$. After the expiration of any given phase delay, a trigger signal is transmitted to the associated air gun and at the end of the air gun gun delay the air gun fires. In the case where it is desired to fire the air guns simultaneously, the individual phase delays $P_i$ are selected so that the sum $P_i + g_i$ is a constant. As illustrated in FIG. 3, the trigger delay for any given air gun is defined as the sum of the master delay time m and the associated phase delay time $P_i$, the trigger delay being denoted by the quantity $R_i$. Similarly, the total time expiring between the occurrence of the fire command at time $t_0$ and the firing of an air gun is referred to as the fire delay time and is represented by the quantity $I_i$.

In the preferred embodiment of the invention, if the air gun control unit 10 of FIG. 1 is to be operated independent of CPU 20, upon each firing of the air guns a new measure of each gun delay $g_i$ is acquired. This new measure of the gun delay $g_i$ is then used to determine the appropriate phase delay $P_i$ for that air gun for the next firing sequence. In this way, any drift in the gun delay of an air gun is continuously automatically monitored and accounted for. Operation of the air gun control unit 10 independent of CPU 20 will be referred to as the stand alone mode of operation.

When air gun control unit 10 is used in association with CPU 20, a new measure of the air gun gun delays is also acquired upon each firing of the air guns. In this case, however, a running average of a set of most recent measured gun delays is used for the purpose of computing the appropriate phase delay for each air gun for the next shot. This will be referred to as the computer controlled mode of operation.

Figure 4:
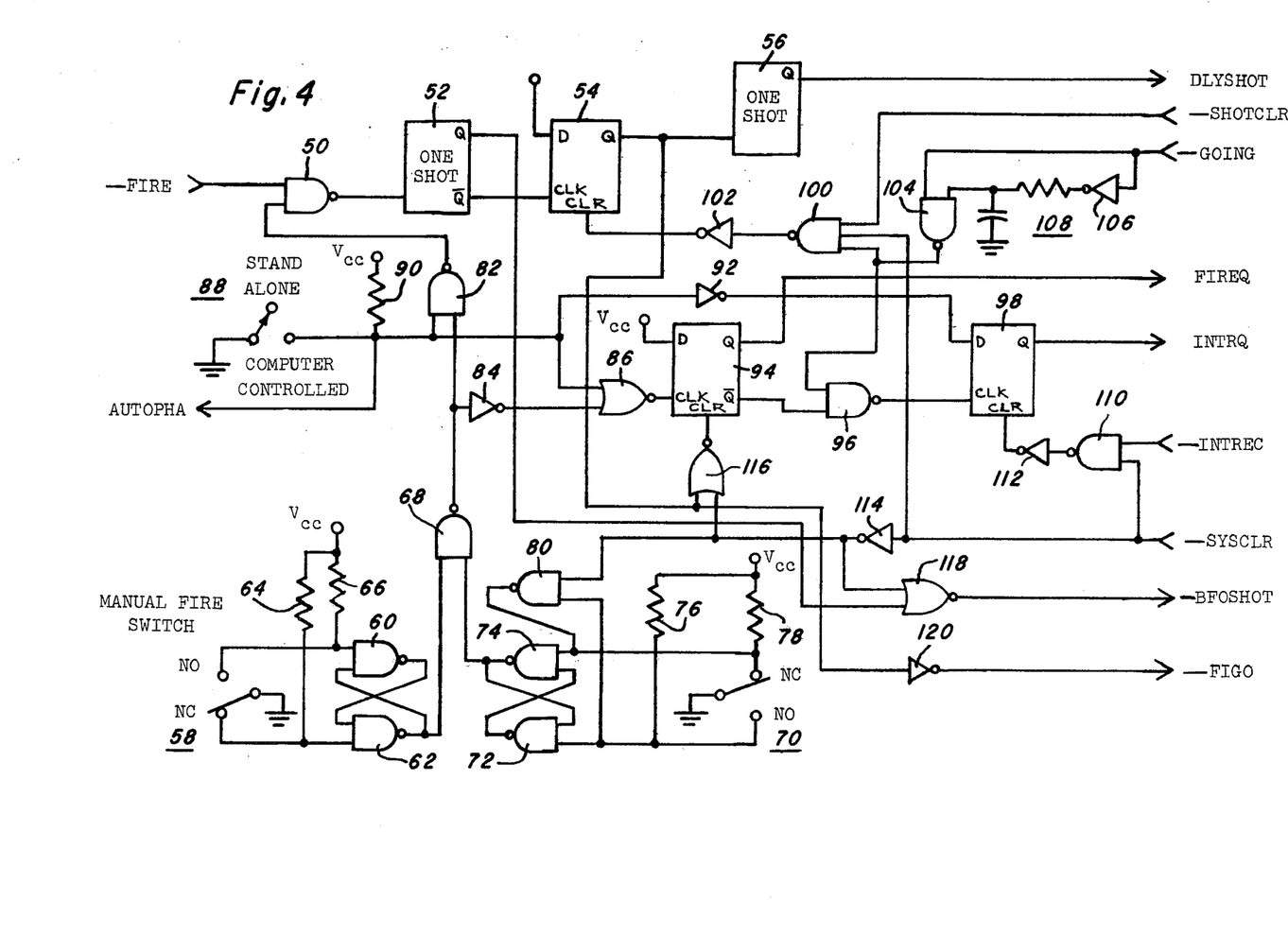
FIG. 4 is a schematic diagram of a portion of the air gun control unit logic circuits.

FIG. 4 is a schematic diagram of a portion of a logic circuit of air gun control unit 10. A first input to NAND gate 50 is a -FIRE signal received from CPU 20. The output of NAND gate 50 triggers one shot circuit 52 the $\overline{Q}$ output of which provides the clock input to D flip flop 54. The D input of flip flop 54 is provided by a positive source of voltage $V_{cc}$. The Q output of flip flop 54 provides the trigger input to one shot circuit 56. As will be explained in more detail subsequently, the Q output of one shot 56, labeled DLYSHOT, is a default master delay signal. A manual fire switch 58 has its switchable terminal returned to ground while its normally opened and normally closed contacts provide one input to each of NAND gates 60 and 62 respectively. These input terminals are returned by resistors 64 and 66 to positive voltage $V_{cc}$. The output of NAND gate 62 is returned to the second input of NAND gate 60 while the output of NAND gate 60 is returned to the second input of NAND gate 62. The output of NAND gate 62 provides a first input of NAND gate 68.

A blaster relay in digital field system 16 is illustrated schematically in FIG. 4 at 70. The switchable terminal of blaster relay 70 is returned to ground while its normally open and normally closed contacts each provide a first input to NAND gates 72 and 74, respectively. The normally open and normally closed contacts are returned to positive voltage supply $V_{cc}$ by resistors 76 and 78. The normally closed contact of blaster relay 70 is also coupled to the output of NAND gate 80. The output of NAND gate 74 provides the second input to NAND gate 72 while the output of NAND gate 72 provides the second input to NAND gate 74. The normally open contact of blaster relay 70 is coupled to a first input of NAND gate 80. The output of NAND gate 74 provides the second input to NAND gate 68. The control of NAND gates 72 and 74 by the blaster relay is illustrated schematically in FIG. 1 by line 18.

The output of NAND gate 68 provides a first input to NAND gate 82 and is also coupled through inverter 84 to the first input of NOR gate 86. A mode selector switch 88 allows an operator to select either the stand alone or computer controlled mode of operation. When in the stand alone mode, the second input of NAND gate 82 is held high by $V_{cc}$ operating through pull up resistor 90. This voltage level at the input of NAND gate 82 is also coupled to inverter 92 and comprises an AUTOPHA signal utilized in the logic circuits of FIG. 5. Finally, the AUTOPHA signal provides the second input to NOR gate 86, the output of which clocks D flip flop 94. The D input of flip flop 94 is provided by the positive voltage supply $V_{cc}$ while its Q output comprises a FIREQ signal coupled to CPU 20. The $\overline{Q}$ output of flip flop 94 provides a first input to NAND gate 96, the output of which clocks D flip flop 98. The output of inverter 92 is coupled to the D input of flip flop 98, the Q output of which comprises an INTRQ signal to CPU 20.

Figure 7:
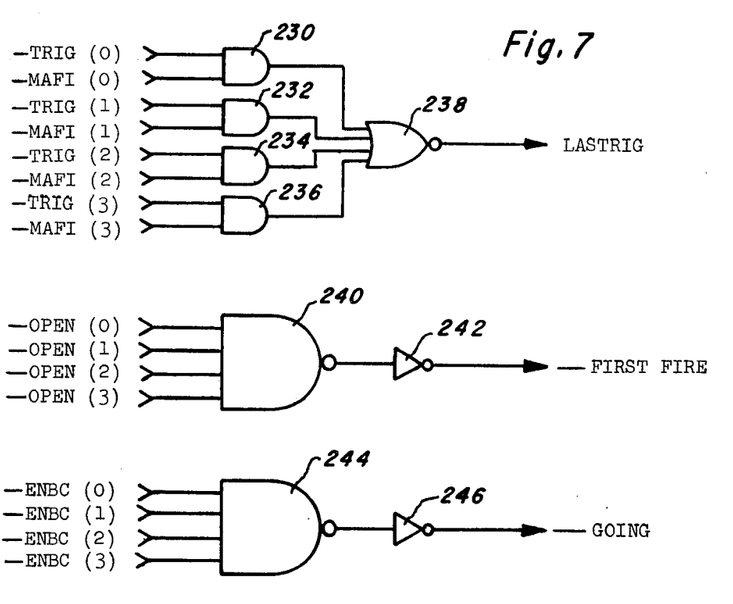
FIG. 7 illustrates logic circuits for generating specific termination signals.

A -SHOTCLR signal from CPU 20 provides a first input to NAND gate 100, the output of which is coupled through inverter 102 to the clear input of flip flop 54. A -GOING signal from the logic circuits of FIG. 7 is coupled directly to a first input of NAND gate 104 and through inverter 106 and RC circuit 108 to the second input of NAND gate 104. The output of NAND gate 104 provides a second input to each of NAND gates 96 and 100.

A -INTREC signal from CPU 20 provides a first input to NAND gate 110 the output of which is coupled through inverter 112 to the clear input of flip flop 98. A -SYSCLR signal from CPU 20 provides a second input to NAND gate 110, a third input to NAND gate 100, and an input to inverter 114. The output of inverter 114 provides the second input to NAND gate 80 and a first input to NOR gate 116 the output of which comprises a clear signal to flip flop 94. The output of inverter 114 also provides a first input to NOR gate 118, the second input of which is provided by the Q output of one shot 52. The output of NOR gate 118 comprises a -BFOSHOT signal utilized in the logic circuits of FIGS. 5 and 6. The Q output of flip flop 54 provides the second input to NOR gate 116 and is coupled through inverter 120 to provide a -FIGO signal for the logic circuit of FIG. 5.

Figure 5:
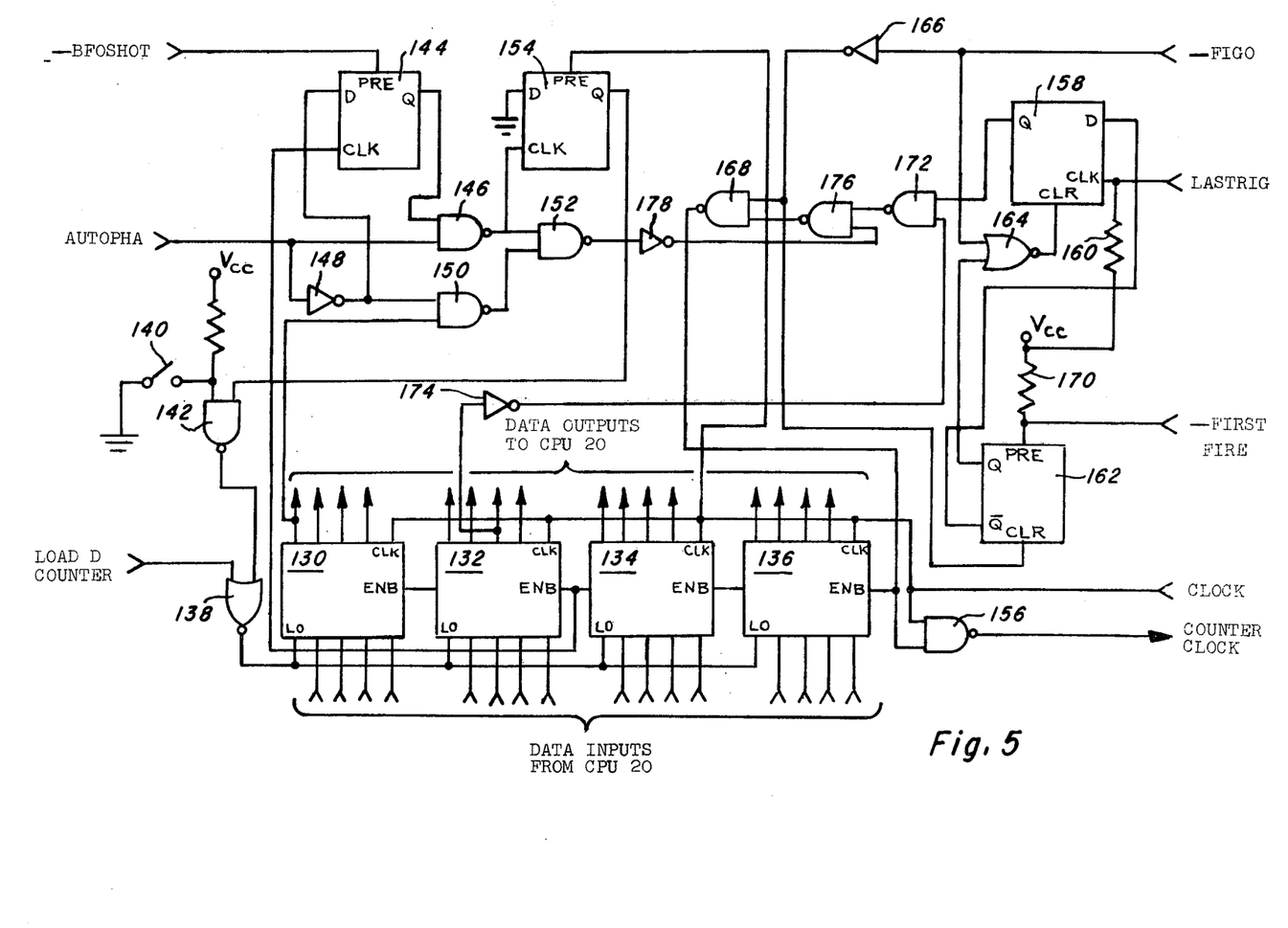
FIG. 5 is a logic diagram of the master delay circuit.

FIG. 5 is a schematic diagram illustrating the logic circuits that implement master delay unit 30 of FIG. 2. The master delay counter itself comprises four Model SN74191 four bit binary counters 130, 132, 134 and 136. The counters are clocked in parallel and are cascaded by coupling the ripple clock output of each counter to the enable input of the next succeeding counter. In this way, the master delay counter comprises a 16 bit binary counter wherein the most significant bit will be designated as D(0), and the least significant bit will be designated D(15). The counter may be loaded with a 16 bit word coupled by data bus 22 from CPU 20 while the 16 bit output of the counter is available to CPU 20 by means of data bus 26. A "load D counter" signal from CPU 30 is coupled through NOR gate 138 to the load inputs of each of the counter sections. A "counter reset" switch 140 may be used to ground one input of NAND gate 142, the output of which provides the second input to NOR gate 138.

The -BFOSHOT signal of FIG. 4 is coupled to the preset input of D flip flop 144. The clock input of this flip flop is provided by the ripple clock output of counter 134. The Q output of flip flop 144 provides a first input to NAND gate 146. The second input of NAND gate 146 is the AUTOPHA signal generated by the logic circuit of FIG. 4. The AUTOPHA signal is inverted by inverter 148 to provide the D input of flip flop 144 and a first input to NAND gate 150. The D(0) output of counter 130 provides the second input to NAND gate 150 the output of which provides a first input to NAND gate 152. The output of NAND gate 146 is coupled to the second input of NAND gate 152 and also to the clock input of D flip flop 154. The D input of flip flop 154 is grounded while the preset input is provided by a 10 kilohertz clock signal. This 10 kilohertz clock signal is also used to clock counters 130, 132, 134 and 136 and also provides a first input to NAND gate 156.

A LASTRIG signal which will be further discussed in connection with FIG. 7, is coupled to the clock input of D flip flop 158 and is further referenced to a positive voltage supply $V_{cc}$ by means of resistor 160. The D input of flip flop 158 is provided by the $\overline{Q}$ output of flip flop 162. The clear input of flip flop 158 is provided by the output of NOR gate 164.

The Q output of flip flop 162 is coupled to a first input of NAND gate 164 while the -FIGO signal generated by the logic circuit of FIG. 4 is coupled to the second input of NOR gate 164. The -FIGO signal is also inverted by inverter 166 to provide a first input to NAND gate 168 and also the clear input to flip flop 162. The preset input of flip flop 162 is referenced to $V_{cc}$ by resistor 170 and is further coupled to the -FIRST FIRE signal of FIG. 7. The Q output of flip flop 158 provides a first input to NAND gate 172 the second input of which is provided by the D(6) output of counter 132 after inversion by inverter 174. The output of NAND gate 172 is coupled to a first input of NAND gate 176, the second input of which is provided by the output of NAND gate 152 after inversion by inverter 178. The output of NAND gate 176 is coupled to the second input of NAND gate 168, the output of which provides the enable input of counter 136, as well as the second input of NAND gate 156. The output of NAND gate 156 provides a clock input to the phase delay counters or C counters such as that illustrated in the logic diagram of FIG. 6.

Figure 6:
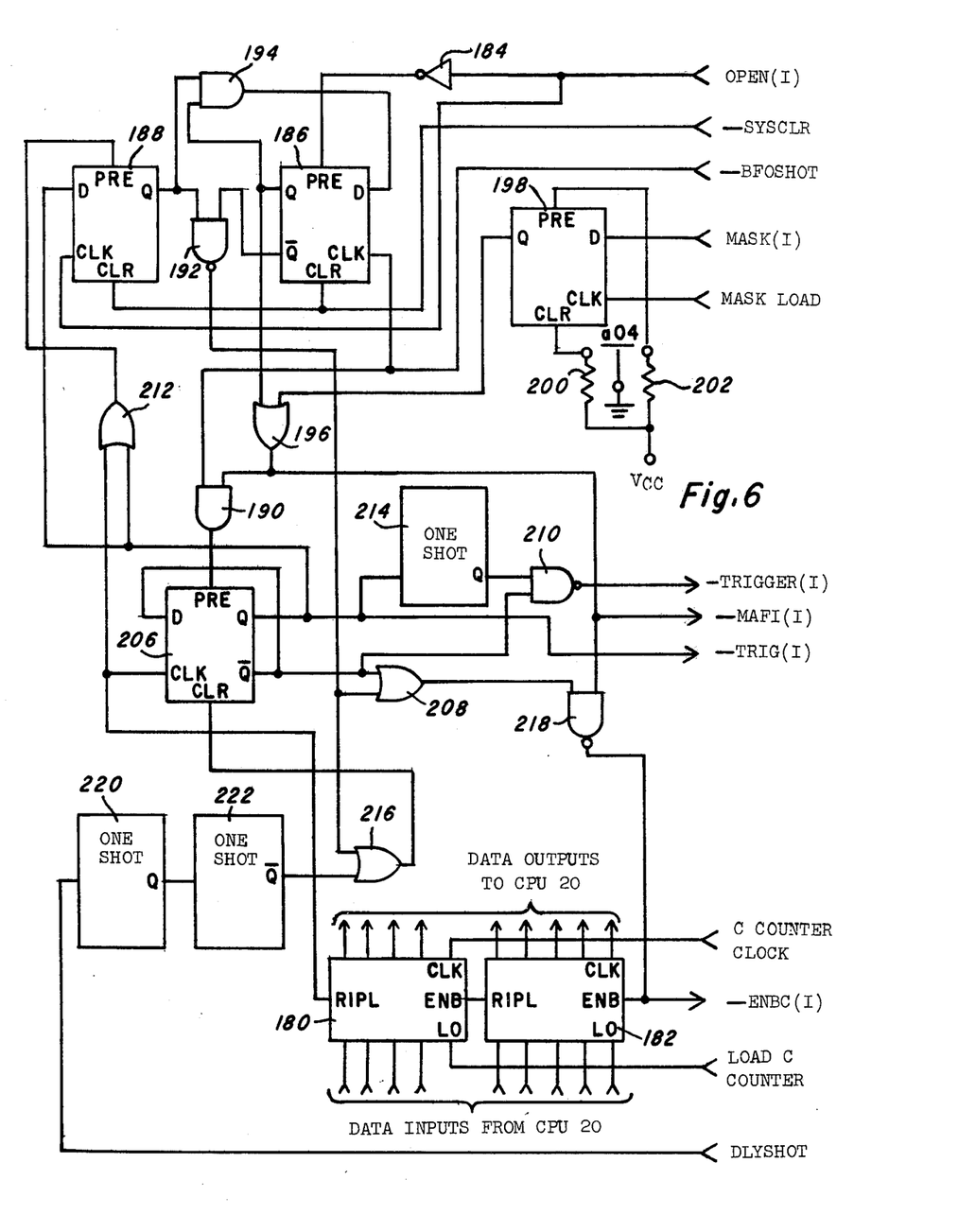
FIG. 6 is a logic diagram of a representative phase delay circuit.

FIG. 6 is a schematic diagram of the phase delay logic circuits associated with a single air gun. In an operative system there will be provided a duplicate of these logic circuits for each air gun to be controlled by the system. The heart of the phase delay circuit is a pair of model SN74191 binary counters 180 and 182 arranged in cascade relationship so as to comprise a single eight bit binary counter. The C counter may be preloaded with input bits from CPU 20 under control of a load C counter signal also from the CPU. The C counter clock inputs are provided by a C counter clock signal generated by the logic circuit of FIG. 5.

In FIG. 6, the OPEN(I) signal is generated by the associated air gun. This signal is normally low but goes high for a brief interval when firing of the air gun is sensed. The OPEN(I) signal is inverted by inverter 184 and coupled to the preset input of D flip flop 186. The OPEN(I) signal is also coupled to the clock input of D flip flop 188. The -SYSCLR signal from CPU 20 is used to clear both flip flops 186 and 188. The -BFOSHOT signal generated by the logic circuit of FIG. 4 forms the clock input to flip flop 186 as well as a first input to AND gate 190. The Q output of flip flop 188 is coupled to a first input of NAND gate 192 and to a first input of AND gate 194. The Q output of flip flop 186 provides the second input to AND gate 194, while the $\bar{Q}$ output of flip flop 186 provides the second input to NAND gate 192. The output of AND gate 194 is coupled back to the D input of flip flop 186. The Q output of flip flop 186 also provides a first input to NOR gate 196. The second input of NOR gate 196 is provided by the Q output of D flip flop 198. The D input of flip flop 198 is provided by a MASK(I) signal from CPU 20 which is clocked into the flip flop under control of a MASK LOAD signal from the CPU. The present and clear inputs of flip flop 198 are coupled to voltage supply $V_{cc}$ through pull up resistors 200 and 202. Either of the preset or clear inputs may alternatively be coupled to ground by means of manual switch 204.

The output of NOR gate 196 is coupled to the second input of AND gate 190, the output of which provides the preset input to flip flop 206. The $\bar{Q}$ output of flip flop 206 is coupled to the D input of the flip flop, to a first input of OR gate 208, and to a first input of NAND gate 210. The Q output of flip flop 206 is coupled to a first input of OR gate 212, to the D input of flip flop 188, and to the input of one shot circuit 214. The output of one shot 214 provides the second input to NAND gate 210, the output of which comprises a -TRIGGER(I) signal which is utilized to trigger the air gun. The Q output of flip flop 206 also comprises a -TRIG(I) signal used in the logic circuit of FIG. 7. The ripple clock output of counter 180 provides the clock input to flip flop 206 and also the second input to OR gate 212. The output of OR gate 212 provides the preset input to flip flop 188. The output of NAND gate 192 provides the second input to OR gate 208 and a first input to OR gate 216. The output of OR gate 208 is coupled to a first input of NAND gate 218, the second input of which is provided by the output of NOR gate 196. The output of NOR gate 196 also comprises a -MAFI(I) signal utilized by the logic circuit of FIG. 7. The output of NAND gate 218 provides the enable input to counter 182 and the -ENBC(I) signal for use by the logic circuit of FIG. 7.

The DLYSHOT signal generated by the logic circuit of FIG. 4 provides the trigger input to one shot circuit 220. One shot circuit 220 has an adjustable time delay and serves to provide a default phase delay function in the event of a fault condition. The Q output of one shot circuit 220 provides the trigger input to one shot circuit 222. When the positive to negative logic shift occurs at the output of one shot 220 at the end of its variable time delay there is induced a negative pulse at the $\bar{Q}$ output of one shot 222. This $\bar{Q}$ output provides the second input to OR gate 216, the output of which provides the clear input to flip flop 206.

FIG. 7 is a schematic diagram of logic circuits which monitor the firing of the array of air guns and provide a -LASTRIG signal which goes high when the last enabled gun in the array is triggered, a -FIRST FIRE signal which goes low when the first gun in the array fires, and a -GOING signal which, under normal conditions, goes high when the last gun in the array fires. These three output signals from the logic circuits of FIG. 7 are utilized in the logic circuits of FIGS. 4 and 5. In FIG. 7 the inputs to AND gates 230, 232 234 and 236 are the -TRIG(I) and -MAFI(I) signals provided by the phase delay circuit for each of the air guns, one such phase delay circuit being illustrated in FIG. 6. The outputs of these AND gates are all coupled to NOR gate 238, the output of which is the LASTRIG signal.

The four inputs to NAND gate 240 are the -OPEN(I) signals from four of the air guns. The output of NAND gate 240 is coupled through inverter 242 to provide the -FIRST FIRE signal. Similarly, the four inputs to NAND gate 244 are the -ENBC(I) signals provided by the phase delay circuit such as that illustrated in FIG. 6. The output of NAND gate 244 is coupled through inverter 246 to provide the -GOING signal.

While the logic circuits of FIG. 7 are illustrated for the case of four guns, in general there will be a large number of air guns to be controlled by the controller. In the more general case, circuits of the type illustrated in FIG. 7 are provided for each additional set of four air guns. For example, there will be a NAND gate corresponding to NAND gate 238 for each such set of four air guns. The outputs of all the NAND gates such as NAND gate 238 are connected in common so that the LASTRIG signal represents the triggering of the last gun in the entire array. Similarly, the outputs of all inverters corresponding to inverter 244 are connected in common as are the outputs of all inverters corresponding to inverter 246. As a result, the -FIRST FIRE signal and -GOING signals represent the operation of the entire array.

Figure 8A:
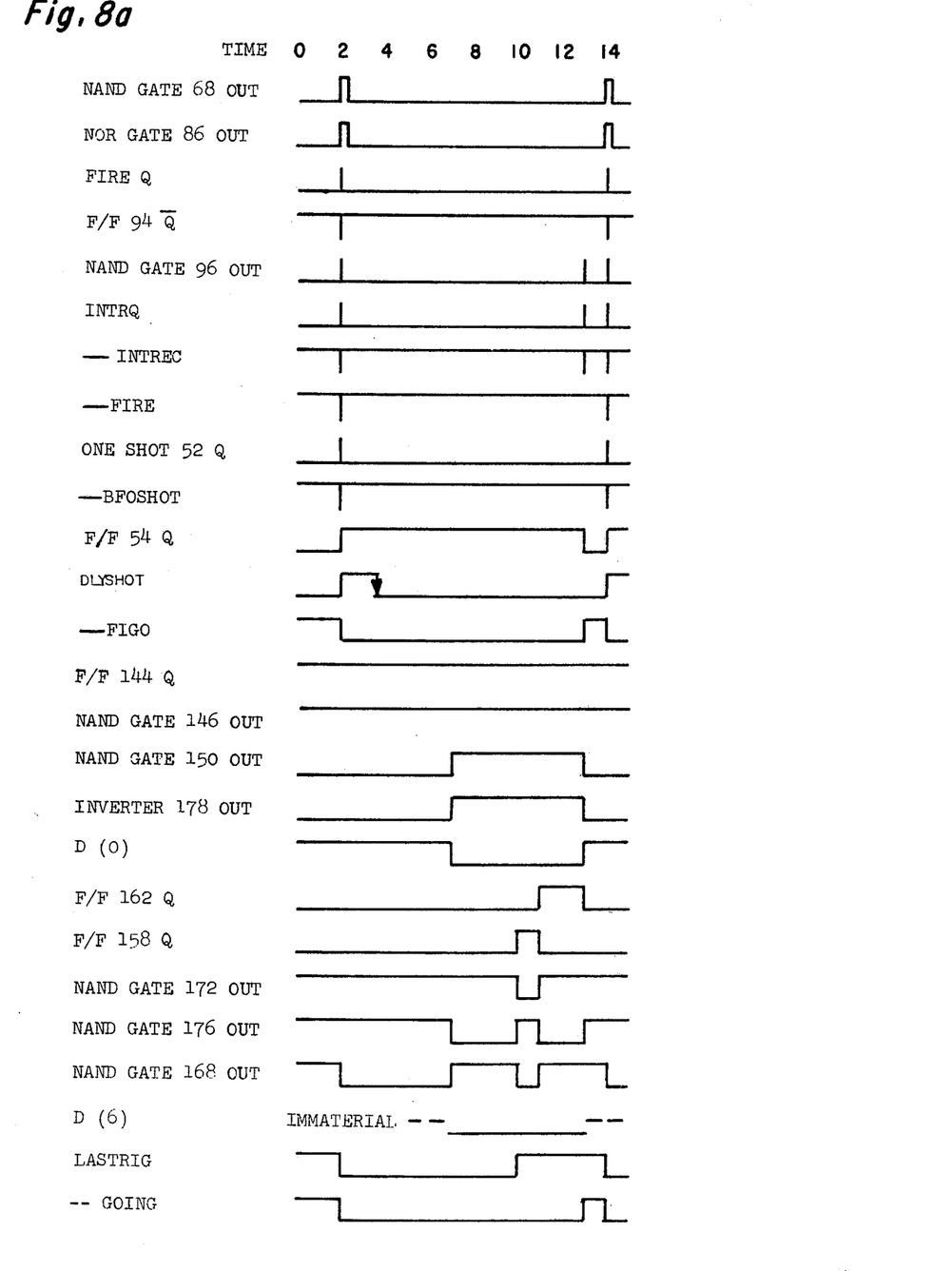
FIGS. 8a and 8b are logic waveform diagrams illustrating operation of the controller.
Figure 8B:
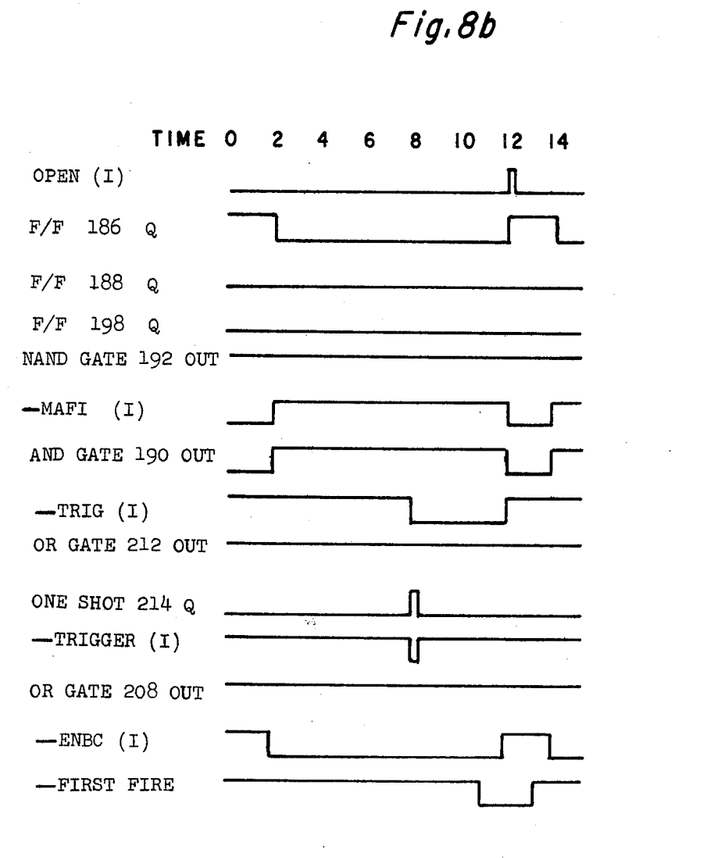

The logic level diagrams of FIGS. 8a and 8b may be helpful in understanding the operation of the air gun control unit. In these figures it has been assumed that mode control switch 88 of FIG. 4 is in the computer controlled position and that consequently the AUTOPHA signal is in the low logic state. The time scales at the top of the FIGURES is arbitrary and inserted for the purpose of convenience in referring to event occurrences during a firing sequence. The various logic levels illustrated between time 0 and time 2 are the normal levels for the points in the circuit prior to the initiation of a firing sequence.

Prior to initiation of a firing sequence, both inputs to NAND gate 68 of FIG. 4 will be high. In the computer controlled mode, the computer alone can cause the firing sequence to begin. The computer, however, does so in response to a fire request, initiated either by moving the manual fire switch 58 to its normally open position or by the blaster relay 70 in the DFS moving to its normally open position. In either event, one of the inputs to NAND gate 68 will go low and the output of NAND gate 68 will go high for as long as one of switches 58 and 70 is in its normally open position. This is illustrated in FIG. 8a at time 2. At this point in time the CPU 20 will already have preloaded the master delay counter of FIG. 5 and each of the phase delay counters such as that illustrated in FIG. 6. Since the AUTOPHA signal is low, the NOR gate 86 is enabled and the low to high transition at the output of NAND gate 68, after inversion by inverter 84, causes the output of NOR gate 86 to go high. This low to high transition clocks flip flop 94 causing the FIREQ signal to go high. This is a fire request to CPU 20. At the same time the Q output of flip flop 94 goes low causing the output of NAND gate 96 to go high. This causes the output of flip flop 98, that is the INTRQ signal, to go high. This is a request to the CPU asking the CPU to recognize the fire request signal and to transmit a -FIRE signal. The CPU responds first by causing the -INTREC signal to go low momentarily at time 2 thereby clearing flip flop 98 and allowing the INTRQ signal to return low. At the same time, that is at time 2 the CPU causes the -FIRE signal to go low momentarily. The brief negative going excursion in the -FIRE signal, after passing through enbled NAND gate 50, triggers one shot corcuit 52 causing its Q output to undergo a brief positive going excursion. This is coupled through enabled NOR gate 118 to cause a brief negative going excursion in the -BFOSHOT signal. At the conclusion of the short period of one shot 52 the low level to high level transition in its Q output clocks flip flop 54 causing the Q output thereof to go high. This triggers one shot 56 causing the DLYSHOT signal to go high for a period which is adjustable by an operator. The period of one shot circuit 56 is the master delay period that is utilized in a default condition, that is when the normal counting circuitry is to be bypassed. The low to high transition in the Q output of flip flop 54 at time 2 resets flip flop 94 causing the FIREQ signal to return low and the output of NAND gate 96 to return low. Finally, this high level Q output of flip flop 54 results in a high to low transition in the -FIGO signal.

Referring next to the master delay circuit of FIG. 5, the Q output of flip flop 144 may have been in either state prior to time 2 but the negative pulse in the -BFOSHOT signal at time 2 insures that the Q output is preset to the high logic level. The low level AUTOPHA signal causes the output of NAND gate 146 to be high. As previously noted, the master delay counter will already have been preloaded by CPU 20 and is always preloaded with the D(0) bit in the high logic state. Accordingly, at time 2 the output of NAND gate 150 will be low as will be the output of inverter 178. The Q outputs of both flip flops 158 and 162 are initially in the low state. Accordingly, the output of NAND gate 172 is initially high but the low level at the output of inverter 178 keeps the output of NAND gate 176 initially high. The transition in the -FIGO signal at time 2 causes the output of NAND gate 168 to go low thereby enabling the master delay counter to begin counting. Both the LASTRIG signal and the -GOING signal are in the low logic state at this time. Turning next to the logic diagrams of FIG. 8b and with reference to the logic circuit of FIG. 6, the OPEN(I) signal is initially low. In the normal course of events the Q output of flip flop 186 will be in the high logic state prior to time 2 from the last firing sequence but the pulse in the -BFOSHOT signal at time 2 clocks the Q output of flip flop 186 low. Assuming that no prior fault condition exists and that the particular air gun has not been masked by the CPU, the Q outputs of both flip flops 188 and 198 are initially low. The low level output of flip flop 188 causes the output of NAND 192 to be initially high. When the Q output of flip flop 186 goes low at time 2, both inputs to NOR gate 196 are low and its output, that is the -MAFI(I) signal goes high. Prior to time 2 the output of AND gate 190 will have been low thereby presetting the Q output of flip flop 206 high. At time 2 the high level transition at the output of NOR gate 196 causes the output of AND gate 192 to go high thereby freeing flip flop 206. The output of flip flop 206, that is the -TRIG(I) signal, remains high after time 2. The high level -TRIG(I) signal causes the output of OR gate 212 to be high and the Q output of one shot 214 remains at its initial low logic level. As a result, the -TRIGGER(I) signal, that is the signal which causes the air gun to fire, will remain in its initial high logic level. The high logic level at the output of NAND gate 192 causes the output of OR gate 208 to be high. As a result the negative to positive transition in the output of NOR gate 196 at time 2 causes the output of NAND gate 218 to go low as is illustrated by the -ENBC(I) signal. Finally, the -FIRST FIRE signal remains in its initial high logic state. In this condition after reception of a -FIRE signal from CPU 20, the low logic level at the enable input of counter 136 permits the master delay counter to begin counting. At the same time this low logic level at the enable input of counter 136 blocks NAND gate 156 and prevents the 10 kilohertz clock input from being passed to the phase delay counter of FIG. 6.

This continues until, illustrated at time 7, the combination of counters 130, 132, 134 and 136 overflows thereby rendering all of its output bits 0. The low level D(0) output bit causes the output of NAND gate 150 to go high, in turn causing the output of inverter 178 to go high. As a result, the output of NAND gate 176 switches low and the output of NAND gate 168 goes high. This has the effect of disabling the master delay counter of FIG. 5 and NAND gate 156 is now enabled to pass the clock signal to the phase delay counter of FIG. 6. As illustrated by the -ENBC(I) signal of FIG. 8b, the phase delay counter is enabled at this point in time and begins counting.

It should be recalled that at the time NAND gate 156 becomes enabled, the clock signal is passed to all phase delay counters including the one illustrated in FIG. 6. At some point in time, each of the phase delay counters will overflow thereby causing the ripple clock output of the phase delay counter to produce a very brief negative pulse. This pulse in FIG. 8b is assumed to occur at time 8 for the phase delay counter of FIG. 6 and the return to high logic level at the conclusion of the pulse clocks flip flop 206. This causes the Q output of flip flop 206, that is the -TRIG(I) signal, to go low at time 8. One shot circuit 214 is coupled to trigger on the positive to negative excursion in the Q output of flip flop 206 with the result that its Q output experiences a brief positive going pulse at time 8. At this point in time the high level Q output of flip flop 206 enables NAND gate 210 thereby producing a negative going pulse in the -TRIGGER(I) signal to trigger the associated air gun.

In this illustrative discussion, it will be assumed that all air guns are triggered before the first air gun fires. Accordingly, the next event in the firing sequence will be the triggering of the last air gun. When the last air gun is triggered, the LASTRIG signal of FIG. 7 goes high. In FIG. 8a this is shown to occur at time 10. This transition in the LASTRIG signal clocks the Q output of flip flop 158 high and, since the D(6) bit in the master delay counter is low at this point, the output of NAND gate 172 switches low. This in turn causes the output of NAND gate 176 to switch high and the output of NAND gate 168 to switch low, both at time 10. Accordingly, the master delay counter is once again enabled while the clock is disabled from the phase delay counters.

The next to occur in the sequence is the firing of the first air gun. In FIGS. 8a and 8b this is assumed to occur at time 11 as evidenced by the negative going transition in the -FIRST FIRE signal. This transition in the -FIRST FIRE signal presets the Q output of flip flop 162 high thereby clearing flip flop 158 and causing its Q output to return low. This results in the output of NAND gate 172 going high, the output of NAND gate 176 going low, and the output of NAND gate 168 going high, all at time 11. Thus, once again the master delay counter is disabled and the clock is again connected to the inputs to the phase delay counters.

In the example being discussed it is assumed that the air gun controlled by the circuit of FIG. 6 is not the first to fire, but rather that this air gun fires at time 11. Thus, with reference to FIG. 8b there is a brief positive going pulse in the OPEN(I) signal at time 12. With reference to FIG. 6, this presets the Q output of flip flop 186 high at time 12. This transition in the Q output causes the output of NOR gate 196, that is the -MAFI(I) signal to switch low at time 12. The resulting low level output from AND gate 190 presents the Q output of flip flop 206 back to the high logic level. At the same time the low level -MAFI(I) signal causes the output of NAND gate 218 to switch high, thereby disabling the phase delay counter.

The next event to occur is the positive going transition in the -GOING signal indicating that the last enabled air gun has fired. This is represented in FIG. 8a to occur at time 13. This transition in the -GOING signal results in a brief negative going excursion at the output of NAND gate 104 in FIG. 4. The first result of this negative pulse at the output of NAND gate 104 is the clocking of flip flop 98 and the generation of a INTRQ pulse. This INTRQ pulse coupled with the absence of a FIREQ pulse is interpreted by CPU 20 to indicate that the firing sequence has terminated. At this point in time the CPU reads the contents of the master delay and phase delay counters. From the previous discussion it will be noted that the master delay counter at this point in time will contain a count of the time that has expired between the triggering of the last air gun and the firing of the first air gun. Similarly, each of the phase delay counters will contain a count corresponding to the sum of the time that expires between the firing of the first air gun and the firing of the corresponding air gun plus the time that expires between the triggering of the corresponding air gun and the triggering of the last air gun. The sum of the count in master delay counter and the count in any phase delay counter therefore will be seen to be equal to the measured gun delay for the corresponding air gun. Thus, by reading the master delay counter and each of the phase delay counters, CPU 20 acquires an updated estimate of the current gun delay for each of the air guns. These current estimates are utilized to compute a running average and to determine the appropriate contents to be loaded into the master delay and phase delay counters in preparation for the next shot. These quantities are loaded into the counters at time 13. At the same time, CPU 20 reads the contents of the fault register, that is the flip flops corresponding to flip flop 188, the fire register comprised of flip flop 186 and its counterparts in the other phase delay circuits, and the mask register comprised of flip flop 198 and its counterparts. In this way the CPU 20 determines the current status of all air guns. Finally, at time 13 CPU 20 returns a -INTREC pulse thereby clearing flip flop 98.

Also at time 13 the brief negative pulse at the output of NAND gate 104 is coupled to NAND gate 100 and inverter 102 to clear flip flop 54 thereby causing its Q output to return low. There is a corresponding low to high transition in the -FIGO signal at time 13.

With the preloading of the master delay counter, its D(0) signal goes high at time 13 resulting in low levels at the outputs of NAND gate 150 and inverter 178. The high level -FIGO signal coupled through inverter 166 clears the Q output of flip flop 162.

At some time shortly after time 13 the brief negative pulse in the -OPEN(I) signal for the last air gun to fire will expire and the -FIRST FIRE signal returns high. At this point in time the air gun controller is again in a state awaiting the initiation of the next firing sequence by actuation of either manual fire switch 58 or DFS blaster relay 70. This event is depicted to occur at time 14.

During operation of the air gun controller certain abnormal conditions may occur. It is possible to mask a given air gun either by operating the corresponding switch 204 to preset flip flop 198 high or if the computer through the MASK(I) and MASK LOAD signals sets the Q output of flip flop 198 high. In this case the output of NOR gate 196 will remain low and the output of NAND gate 218 remains high so that the phase delay counter can never begin counting and ultimately set the trigger flip flop 206 by means of the ripple counter output. Thus, masking the associated air gun in this manner prevents the gun from firing until the mask condition is removed.

It sometimes happens that an air gun will fire even in the absence of a trigger signal from the associated phase delay circuit or more than once in response to a signal trigger signal. In this case the OPEN(I) signal will clock fault flip flop 188 when the D input of that flip flop derived from the Q output of flip flop 206 is still high. The Q output of fault flip flop 188 goes high thereby indicating a fault condition. CPU 20 determines the nature of the fault condition by the examining the output of fire flip flop 186. This output will have been preset high by the OPEN (I) signal. The high level outputs of both the fault flip flop and fire flip flop indicates to CPU 20 that a self-fire fault has occurred. In the computer controlled mode, the CPU records the self-fire condition on a log and clears the fault and fire registers so that the gun can be fired on the next sequence. In the stand alone mode, the fault is not cleared and the gun is inhibited from further firing.

Another type of fault, that is no-fire fault, occurs when the phase delay circuit generates a trigger signal but the associated air gun fails to fire. In this case there is no signal to preset the fire flip flop and as a result the phase delay counter is not disabled. The counter, therefore, continues to count until a second low level ripple counter output occurs at the input of OR gate 212. At this point in time the Q output of flip flop 206 will also be low and the resultant low level at the output of OR gate 212 presets the Q output of fault flip flop 188 high. CPU recognizes this is a no-fire condition since the Q output of fire flip-flop 186 is still low. The combined states of fault flip flop 188 and fire flip flop 186 result in a low level at the output of NAND gate 192 thereby enabling OR gate 216. Again in the computer controlled mode, the CPU records the no-fire fault on a log and clears the fault so the gun can be fired in the next firing sequence. In this case, however, the contents of the phase delay counter of the non-firing gun are not used by the CPU to update the running average of gun delay for that gun.

In the stand alone mode, when the no-fire fault occurs, a default delay system is enabled. It will be recalled that the DLYSHOT input signal of FIG. 6 is a master delay signal generated by the circuit of FIG. 4 and is to be used in the event of a default condition. The negative going transition that occurs in the DLYSHOT signal in the next sequence causes a positive pulse to occur at the Q output of default phase delay one shot circuit 220. The duration of this positive pulse may be set by the operator of the equipment. At the termination of this positive pulse one shot circuit 222 is triggered to produce a brief negative going pulse at its Q output. This negative pulse results in a low level at the output of OR gate 216 to clear the Q output of flip flop 206 low, resulting ultimately in the generation of a -TRIGGER(I) signal to the air gun. Thus, in the event of a no fire fault, the default timing circuit comprised of one shot circuit 56 of FIG. 4 and one shot circuit 220 of FIG. 6 control the timing of the air gun firing. After the default circuit has triggered the gun, however, the phase delay counter is enabled to count normally. Accordingly if the gun produces an OPEN(I) signal on some subsequent shot the fault register will be cleared and the phase delay counter will contain the most recent gun delay measure so normal operation can resume. Thus in the stand alone mode, the controller can switch back and forth between the default timing and the more precise counter timing.

Next the departures that occur from the above description when the controller is operated in the stand alone mode will be described. In this case it will be seen from a consideration of FIG. 4 that the AUTOPHA signal will occupy the high logic level. As a result NAND gate 82 will be enabled and, since the -FIRE signal is maintained high in the stand alone mode, NAND gate 50 will also be enabled. As a result, the positive pulse that occurs at the output of NAND gate 68 when either manual switch 58 or DFS blaster relay 70 is actuated will be passed directly to one shot circuit 52 to initiate the firing sequence.

Prior to initiating the first firing sequence in the stand alone mode, switch 140 of FIG. 5 is momentarily closed. This results in a low level signal to the load input of each of the counters comprising the master delay counter and results in loading all zeros to the 16 bits of the master delay counter from the data inputs which are held low in the stand alone mode. In view of the high level AUTOPHA signal, NAND gate 146 is enabled while the output of NAND gate 150 is held high thereby also enabling NAND gate 152. As a result the Q output of flip flop 144, which is preset high by the -BFOSHOT signal, is coupled through NAND gates 146 and 152 to produce a low logic state at the output of inverter 178. This results in a high level at the output of NAND gate 176 and the low level -FIGO signal that occurs after the firing sequence is initiated results in a low level at the output of NAND gate 168 thereby enabling the master delay counter and decoupling the clock input from the phase delay counters. The master delay counter then continues to count until that portion comprising counters 134 and 136 overflow thereby resulting in a low level ripple clock pulse at the output of counter 134. This pulse clocks flip flop 144 causing its Q output to go low ultimately resulting in a high level at the output of NAND gate 168 to disable the master delay counter and couple the clock input to the phase delay counters. The remainder of operation in the stand alone mode is substantially similar to that described above.

The principle difference is that in the stand alone mode the master delay counter terminates counting when the ripple counter output of counter 134 goes low rather than awaiting a low level D(0) signal at counter 130. In the stand alone mode, since there is no CPU to reload the counters in preparation for the next firing sequence, the master delay and the phase delay counters will contain the counts that they have achieved during the last previous firing sequence. As discussed above, the sum of this count in the master delay counter and in the phase delay counter corresponds to the gun delay for the corresponding air gun. If both the master delay counter and the phase delay counter begin with 0, the total number of clock pulses required to produce a ripple clock output from counter 134 of the master delay counter and then to produce a ripple clock output from counter 180 of the phase delay counter is 512 pulses. This corresponds to a period of 51.2 milliseconds with an 0.1 millisecond clock period. The counters do not begin from 0, but on the contrary begin with counts the sum of which correspond to the last estimate of gun delay. The time required between the initiation of a firing sequence and the production of a ripple clock output at the output of the phase delay counter is equal to the quantity 51.2 milliseconds minus the last measured gun delay for the corresponding air gun. With reference to FIG. 2, this time period is the trigger delay for air gun 1, designated $R_i$. The total fire delay $I_i$ for air gun i is the sum of this quantity and the gun delay for air gun i that is $g_i$. Thus, to the degree that the actual air gun delay for the next firing sequence is equal to the measured air gun delay from the last firing sequence, the air gun fire delay for all air guns will be equal to a constant 51.2 milliseconds. Thus, in the stand alone mode the gun delay estimates are updated so as to maintain the fire delay for all the air guns substantially constant.

Figure 9:
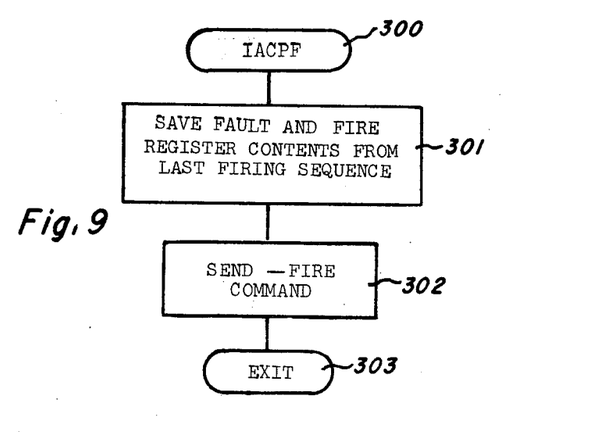
FIG. 9 is a flowchart of the CPU response to a fire request interrupt.

FIG. 9 is a flow diagram illustrating the response of CPU 20 to a fire request interrupt from the air gun controller. The subroutine is entered at step 300. At step 310 CPU 20 stores the fault and fire register contents from the last firing sequence. At step 302 a -FIRE command is sent to the air gun controller. The subroutine is exited at step 303.

Figure 10:
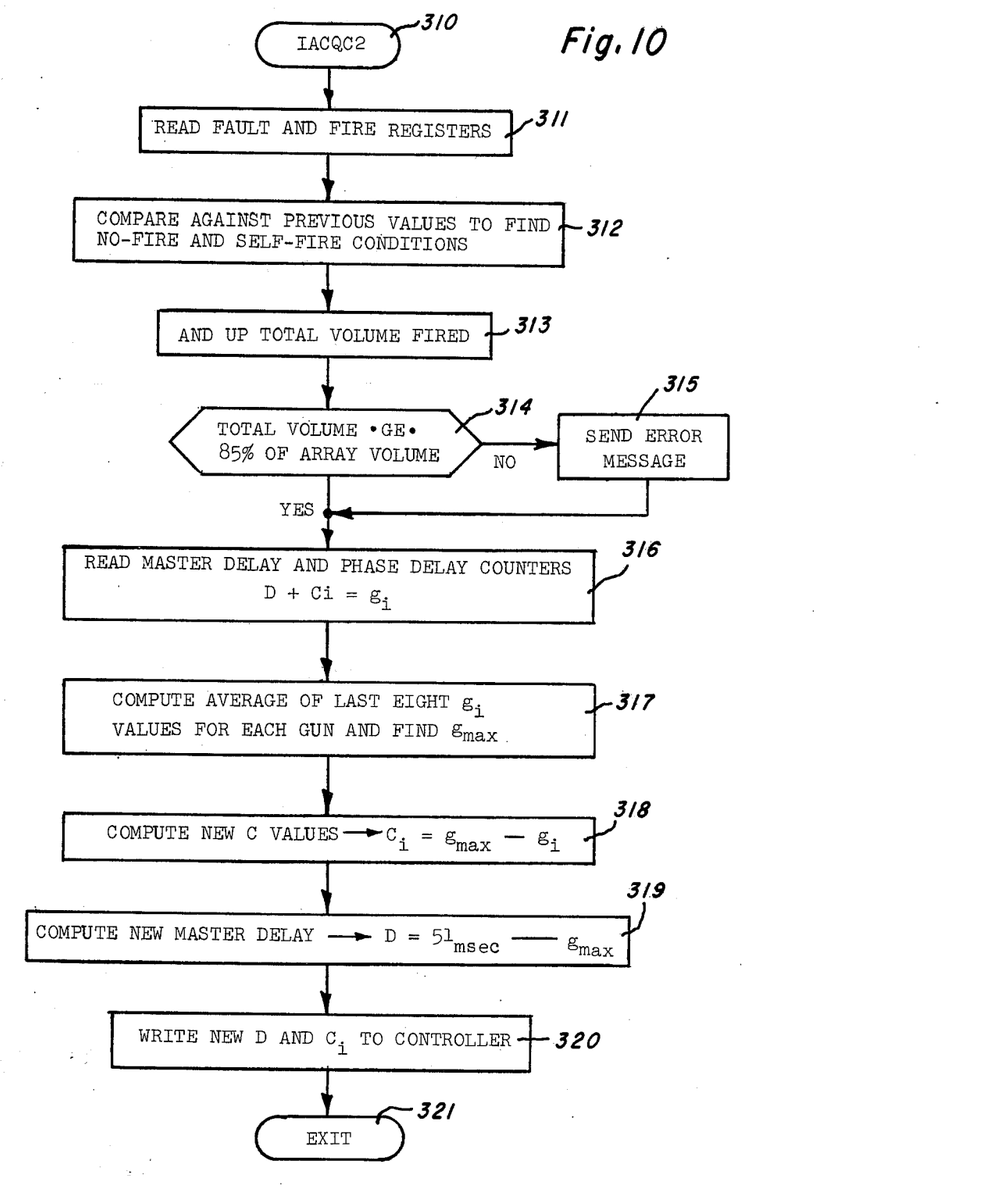
FIG. 10 is a flow diagram of the CPU response to a firing sequence complete interrupt.

FIG. 10 is a flow chart illustrating the response of CPU 20 to an interrupt indicating that a firing sequence has been completed by the air gun controller. This subroutine is entered at step 310. At step 311 CPU 30 reads the contents of the fault and fire registers as they result from the most recent firing sequence. At step 312 these contents are compared with the previous stored values for the fault and fire registers to determine no-fire and self-fire conditions. As previously noted, upon detection of a self-fire condition the fault is recorded on a status log. At step 313 the total air gun volume that has fired is computed. This is possible since one of the steps involved in initiation of the air gun controller is the entry into CPU 20 of the volume of each of the active air guns. Accordingly, with the determination of those air guns which are fired at step 312 CPU 20 is enabled to compute the total volume of fired air guns. At step 314 CPU 20 determines whether or not the total volume of fired air guns is greater than or equal to 85% of the desired array volume. If the answer is yes the flow proceeds to step 316. If the answer is not an error message is sent at step 315. The error message may be displayed on printing equipment associated with CPU 20 and/or displayed on the front panel of the air gun controller unit. After transmission of the error message flow proceeds to step 316. At step 316 CPU reads the contents of master delay and phase delay counters. As previously noted, the sum of the contents of these two counters represented by the quantity $D+C_i$ in the flow diagram is equal to the gun delay for the corresponding air gun $g_i$. At step 317 the average of the most recent eight $g_i$ values for each air gun is computed. The most recent estimate of $g_i$, however, will not be entered into the running average if it differs from the average by more than a preselected threshold. In this way, occasional anomalous values are prevented from biasing the average. Beyond this point is the flow diagram the average is used as the estimate of gun delay $g_i$.

Also at step 317 $g_{max}$ the largest of the newly computed averages for the air gun delays is determined. At step 318 new values are computed for each of the phase delay counters. The new value $C_i$ for any given counter is equal to the difference between $g_{max}$ and the quantity $g_i$. At step 319 the new master delay is computed and is set equal to the difference between a predetermined desired fire delay time and the quantity $g_{max}$. In the preferred embodiment the desired fire delay time is 51 milliseconds. At step 320 the new values of the D and $C_i$ are written to the air gun controller. The subroutine is exited at step 321.

When the new values for D and $C_i$ are received by the air gun controller the ones complement of these values are actually entered into the master delay and phase delay counters. As a result, the master delay counter will be required to count through the number of counts represented by the D quantity of step 319 before generating a 0 at its D(0) bit and thereby terminate its counting sequence. Similarly, the phase delay counter will be required to count through the number of counts represented by the quantity $C_i$ computed at step 318 of the flow diagram before generating a ripple counter output that triggers the associated air gun. Accordingly, the number of counts that must occur between the reception of a -FIRE command and the triggering of a given air gun is equal to the quantity $D+C_i$ which from steps 318 and 319 of the flow diagram is seen to be equal to the quantity 51 milliseconds -$g_i$. This of course is the trigger delay for the corresponding air gun. To the extent that the quantity $g_i$ is an accurate estimate of the gun delay for the associated air gun, this trigger delay, when added to the actual gun delay for the air gun, results in an air gun fire delay which is substantially equal to 51 milliseconds.

While the above examples have assumed that it is desired to fire the air guns simultaneously, there may be situations where non-simultaneous firing is desired. If the air guns are all towed at the same depth, for example, it may be desired to fire the air guns in some sequence so as to produce a plane wave front travelling in a direction other than vertical. In such a case it is a simple matter to add appropriate time delays to the individual phase delay counters so as to produce the desired sequential firing of the air guns. Alternatively, there may be situations where the air guns are towed at a variety of depths but it is still desired to produce a single vertically travelling plane wave front. In the preferred embodiment of the invention the plurality of air guns are towed in an inline arrangement behind the marine seismic prospecting vessel. The air guns, however, do not stream at the same depth. Two or more depth sensors are provided along the air gun array to provide CPU 20 with spatial samples of the array depth. CPU 20 then computes a first order depth equation $$d = a_0 + a_1 s \qquad (1)$$

where:
 d=depth
 s=distance of gun from stern
 $a_0$ and $a_1$ are coefficients computed for a least mean square error fit.

Equation (1) is a least mean square error fit to the measurements from the depth sensors. Since the distance of any given air gun behind the tow vessel, is known, the estimated depth of the air gun $d_\chi$ may be computed in accordance with the equation $$d_{102} = a_0 + a_1 s_\chi. \qquad (2)$$

The appropriate phase correction is given by $$\text{phase correction} = (d_\chi - d_t)/V_s \qquad (3)$$

where:
 $d_t$=specified towing depth
 $V_s$=velocity of sound in water

This phase correction is simply added to the previously determined phase delay so as to result in the appropriate phasing of the air gun array.

Whereas there has been disclosed the preferred embodiment of the invention. There may be suggested to those skilled in the art certain minor modifications which do not depart from the spirit and scope of the invention as defined in the following claims.

We claim:

1. An automatic firing controller for an array of marine seismic sources comprising:
    (a) a master counter for measuring the time delay between the triggering of the last source and the firing of the first source of said array;
    (b) a phase counter for each source, for determining the time between said firing of the first source and the firing of the corresponding source, plus the time between the triggering of the corresponding source and the triggering of the last source, the contacts of the corresponding phase counter plus the contents of the master counter being a measurement of the gun delay of the corresponding source for a given shot in a sequence;

(c) means operable during the next shot in said sequence to cause said master and phase counters to begin counting, the contents of said counters at the initiation of counting being the same as at the instant the corresponding source fired on the immediately preceeding shot in the sequence; and (d) means for triggering each source when the sum of the counts in the master counter and the corresponding phase counter have reached a preselected value.

2. An automatic firing controller for an array of marine seismic sources comprising:

(a) a master counter for measuring the time delay between the triggering of the last source and the firing of the first source of said array;

(b) a phase counter for each source, for determining the time between said firing of the first source and the firing of the corresponding source, plus the time between the triggering of the corresponding source and the triggering of the last source, the contents of the corresponding phase counter plus the contents of the master counter being representative of the gun delay of the corresponding source;

(c) means for combining a plurality of said gun delays for each source to provide an improved estimate of the gun delay for each source;

(d) means responsive to a master fire signal to cause said counters to proceed through respective counts, the sum of the counts for said master counter and one of said phase counters being representative of the difference between a desired fire delay and the gun delay for the corresponding source; and (e) means for triggering each source when the master counter and the associated phase counter have counted through a number of clock pulses corresponding to said difference.

3. The controller of claim 2 further comprising means for determining the depths of the sources and means for including in said respective counts, corrections corresponding to the acoustic wave travel time differences arising from failure of said sources to be located at a predetermined depth.

4. The controller of claim 2 wherein said respective counts are selected so that at least two of said sources fire at different times.

5. A method of automatically controlling the firing of an array of seismic sources initiated by a master fire signal comprising the steps of:

(a) monitoring a signal representative of the firing of a source;

(b) upon each triggering of a source by a trigger signal, measuring time that expires before the source fires;

(c) upon the next occurrence of a master fire signal delaying the trigger signal to each source by a time equal to the difference between a preselected fire delay time and the last measured trigger to fire time for that source; and (d) if a trigger signal is issued to a source but no firing signal is received from the source automatically using a preselected default delay for the source during the next succeeding firing sequence.

6. The method of claim 5 further comprising the step of:

(e) if a source fires without a trigger signal having been issued, automatically disabling the source.

7. A system for automatically firing the sources of a seismic array in a predetermined sequence, the system comprising:

(a) first means for estimating the gun delays of the sources and for repeatedly updating the resultant estimate;

(b) second means responsive to the first means for selectively setting the triggering of the sources to correspond to the updated estimates;

(c) third means for detecting the occurrence of self-fire and no-fire conditions.

(d) fourth means, responsive to the third means for automatically preventing a source from triggering when a self-fire condition is detected for that source; and (e) default timing means, activated by the third means when a non-fire condition occurs to fire the no-fire source.

8. A system for automatically firing the marine seismic sources of a seismic array in a predetermined sequence, the system comprising:

(a) first means for estimating the gun delays of the sources and for repeatedly updating the resultant estimate;

(b) second means responsive to the first means for selectively setting the triggering of the sources to correspond to the updated estimates, including means for determining travel time delays resulting from placement of said sources at varying depths;

(c) third means for detecting the occurrence of self-fire and no-fire conditions; and (d) fourth means, responsive to the third means for automatically preventing a source from triggering when a self-fire condition is detected for that source.

* * * * *